United States Patent

Troeger

[15] 3,677,378
[45] July 18, 1972

[54] SELF-ENERGIZING TORQUE LIMITING DISC CLUTCH

[72] Inventor: Henry Troeger, Cooperstown, N.Y.
[73] Assignee: The Bendix Corporation
[22] Filed: Dec. 28, 1970
[21] Appl. No.: 101,891

[52] U.S. Cl. .................................. 192/54 R, 192/105 C
[51] Int. Cl. ........................................... F16d 43/20
[58] Field of Search .............. 192/54 R, 47, 93 R, 105 C, 192/105 CP

[56] References Cited

UNITED STATES PATENTS

| | | | |
|---|---|---|---|
| 2,230,520 | 2/1941 | Wemp | 192/54 X |
| 3,191,732 | 6/1965 | McDowall | 192/54 X |
| 1,832,527 | 11/1931 | Brown | 192/105 CP |
| 1,841,284 | 1/1932 | Gillett | 192/105 C |
| 2,326,279 | 8/1943 | Banker | 192/105 CP |
| 2,721,639 | 10/1955 | Miller | 192/105 B X |
| 3,027,986 | 4/1962 | Richmond | 192/54 X |
| 3,273,681 | 9/1966 | Seifert | 192/54 |

*Primary Examiner*—Manuel A. Antonakas
*Attorney*—Bruce A. Yungman and Plante, Hartz, Smith & Thompson

[57] ABSTRACT

A self-energizing, torque limiting, manually controlled disk clutch is disclosed herein. The clutch comprises an actuating member which advances on a helical spline to rotate a pressure plate carrier in response to an input control member. After the pressure plate makes initial contact with the friction disk, the clutch self-energizes to a preset torque capacity selected to accelerate the rotor to synchronism as rapidly as reasonable without stalling the engine. After synchronization opposite motion of the control member will increase torque capacity beyond engine rated torque. Thereafter the clutch cannot be manually disengaged but will disengage when the torque is reduced to a predetermined low or negative value, at which time it will completely disengage and overrun. While overrunning, the clutch can be re-engaged by operation of the input member until synchronization is attained.

6 Claims, 3 Drawing Figures

Patented July 18, 1972

HENRY TROEGER
INVENTOR.

BY

Patented July 18, 1972

HENRY TROEGER
INVENTOR.

BY *Bruce A. Yungman*

3,677,378

SELF-ENERGIZING TORQUE LIMITING DISC CLUTCH

FIELD OF THE INVENTION

The present invention relates to a clutch, and more particularly to a clutch for engaging and disengaging a turbine engine drive member with a helicopter rotor drive shaft.

DESCRIPTION OF THE PRIOR ART

In the usage of turbine engines in helicopters, it has become common practice to connect the driven member of the main engine to the helicopter rotor by means of a clutch. Such a clutch must allow the rotor and engine to reach synchronization without stalling the engine. After synchronization, the clutch must permit the clutch output shaft to reach full torque capacity beyond engine rated torque. When the torque is reduced to a predetermined low or negative value, the clutch must be permitted to disengage and overrun.

For a constant input speed, it is the nature of a clutch that it must absorb as heat input an amount of energy equal to the energy increase in the accelerated inertial load plus the energy to overcome drag torque. To minimize clutch heat, it is desirable to use the highest possible clutch torque and lowest permissible engine speed that will not stall the engine. However, lower input speeds (for a turbine engine) require the narrower limits of clutch torque. Too high a torque will stall the engine; too low a torque will result in excessive slippage. The torque of a clutch will vary with the co-efficient of friction, which is affected by temperature and wear, with clutch face pressure which, if spring loaded, will vary with wear, and with pressure distribution which will vary with clutch plate distortion. For reliable and long life performance, then, it is desirable to have as wide a clutch torque range as will permit satisfactory operation. Also, some tolerance must be allowed for clutch cut-in speed. The clutch torque range, cut-in speed, range and mass of clutch material to absorb heat must be selected to provide a satisfactory compromise.

SUMMARY OF THE INVENTION

My clutch is comprised of torque transmitting friction disk interconnecting input and output members, said input member rotated by a screwjack action of an actuating member. The initial rotating movement is obtained by manual means which advances through a limited travel the actuating member on a helical spline operatively engaging a pressure plate carrier. The pressure plate carrier in turn forces the pressure plate into contact with the friction disk. The friction disk and the pressure plate become locked in a torque-exchanging configuration which, so long as the torque transfer is from input to output, will hold the pressure plates and the disk in engagement regardless of the position of the actuating member. After synchronization of the input and output members is attained, the actuating member may be disengaged to release the travel limitation thus permitting full engine rated torque to develop. Release of the initial contacting pressure plate is facilitated by means of a spring located between the two pressure plates thereby allowing the plates to disengage and overrun during low or negative output torque requirements. A loosely splined connection between the pressure plates and their respective carriers permits slight relative rotation thereby avoiding the necessity for slip at the friction interface until after the actuating member has been partially withdrawn.

It is an object of this invention to supply a torque transmitting device having manual control means within the device itself for increasing a clutch engagement force upon the transmission of torque through the device.

Another object of this invention is to provide thrust developing means for increasing the clutch engagement force in the clutch in proportion to the torque transmitted through the clutch.

Another object of this invention is to automatically increase and initially apply clutch engagement force in response to the transmission of torque through the torque transmitting device.

Still another object of this invention is to provide a shiftable control member, being selectively movable to supply an initial clutch engagement force, and also being movable upon the engagement of the clutch to automatically increase the clutch engagement force.

A still further object of this invention is to provide a means selectively movable in a plurality of directions to cause engagement of friction disk means. The engagement force on the friction disk means after being initially engaged is automatically increased upon the transmission of torque through the clutch by reversing the direction of a manually controlled member.

It is yet another object of this invention to provide a novel clutch mechanism wherein a relatively light initial pressure, resulting from actuation of a control member of the like, will cause cooperating force transmitting plates to operate in self-energizing relationship to cause confronting friction disks to be engaged with accompanying transmittal of torque between a driving and a driven element.

A still further object of this invention is to provide, in a self-energizing clutch of the character mentioned, means whereby the parts are positively returned to a normal or disengaged relationship for subsequent actuation of the cooperating parts.

A still further object of the present invention is to provide, in a clutch mechanism of the character mentioned above, means whereby over-travel of the activating unit is provided for in order to prevent damage thereto.

It is a further object of this invention to provide a clutch mechanism wherein movement of a control member in one direction engages the clutch for low torque operation and which, upon movement of the control member in the opposite direction, engages the clutch for high torque operation. The clutch mechanism will not be engaged when the control member is moved in said opposite direction before low torque operation has been established.

It is a general object of the invention to provide a clutch mechanism adapted for use in a helicopter and having the characteristics above said force and having various additional advantageous features of operation and construction.

DETAILED DESCRIPTION OF THE PREFERRED EMBODIMENT

Figure 1:
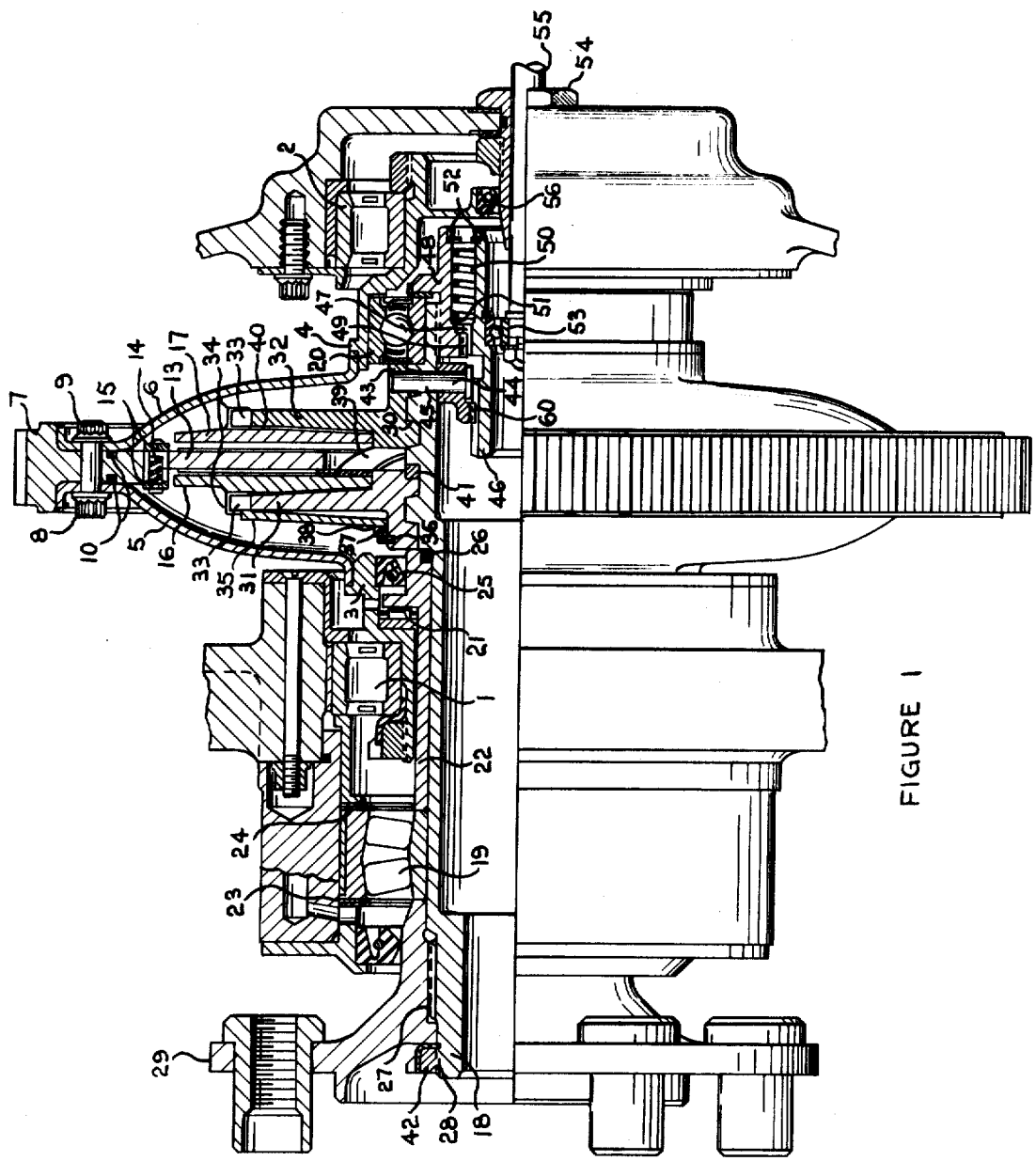
FIG. 1 shows a partial cross-sectional view of the preferred embodiment of a clutch according to the present invention in the disengaged mode.
Figure 2:
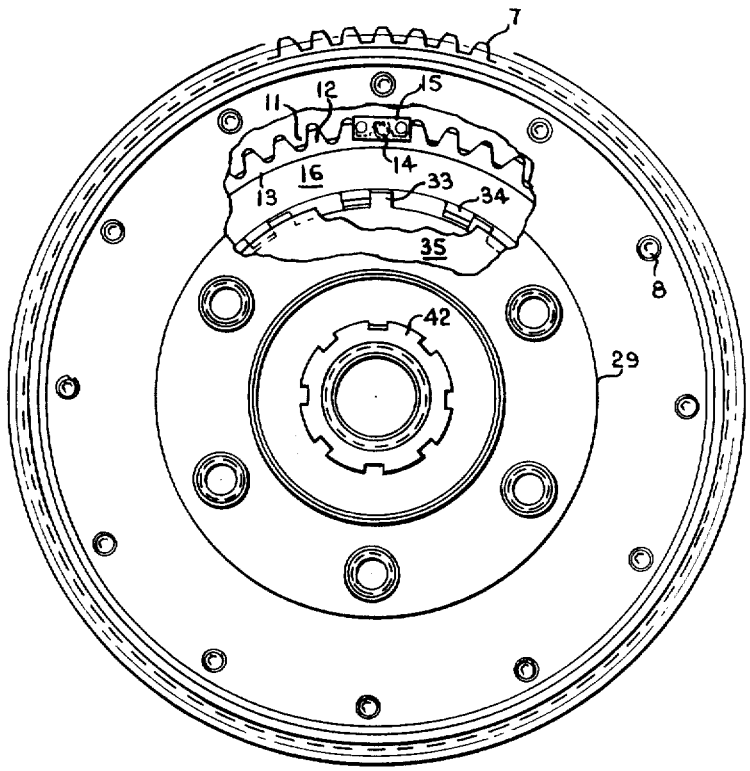
FIG. 2 shows a partial end elevational view of the driving member and the pressure plate carrier connection.

Referring to FIGS. 1 and 2, the clutch assembly is shown supported on two cylindrical roller bearings 1 and 2 whose inner races are mounted on clutch housing hubs 3 and 4 respectively. The hubs 3 and 4 are welded to drawn flanges 5 and 6 between which the drive gear 7 is clamped by bolts 8 and nuts 9. The drive gear 7 is grooved for sealing rings 10 and contains at its inner diameter splines 11 which couple to splines 12 on the periphery of the friction disk 13. The friction disk 13 is located axially by springs 14 and plates 15 riveted to the gear so clearance can be maintained between the friction disk 13 and pressure plates 16 and 17 in the disengaged position.

The clutch output shaft 18 is supported on a spherical roller bearing 19 and a grease-packed sealed ball bearing 20 mounted in the clutch housing hub 4. This ball bearing locates the clutch housing in the leftward direction in the drawing and a caged roller thrust bearing 21 which bears against a flanged sleeve 22 locates the clutch housing in the rightward direction. The spherical roller bearing 19 is shimmed by shims 23 and 24 to obtain proper axial location of the clutch assembly. Seals 25 and 26 are provided between the lift housing hub 3 and flange sleeve 22 and between the sleeve 22 and shaft 18. The shaft 18 extends from the gear box and is provided with a double piloted spline 27 and threads 28 to provide for driving an output drive flange 29.

The shaft 18 has helical splines 30 which meet with left and right flanged pressure plate carriers 31 and 32. The flanges 31 and 32 have teeth 33 on their periphery which engage with teeth 34 on pressure plate 16 and 17. A Belleville spring 35 on the lift carrier is pre-loaded between, at its inner diameter, a lock ring 36, a washer 37 and shim 38 and, at its outer diameter, the flange on the left carrier 31. The pressure plates 16 and 17 are piloted at their inner diameters on the carriers 31 and 32. A wavy spring 39 between the pressure plates maintains the lift pressure plate 16 in contact with the outer diameter of the Belleville spring 35 and the right pressure plate 17 in contact with a shim 40 which bears against the right carrier 32. The shaft 18 is grooved for a split ring 41 which prevents the lift carrier 31 from moving rightward and provides a stop for the right carrier when moved leftward. Leftward motion of the left carrier 31 is prevented by the flanged sleeve 22 which is clamped against the left end of the helical spline 27 by a nut 42 acting in turn against a lock washer, output flange 29, inner race of a spherical bearing 19 and flange sleeve 22.

The right pressure plate carrier 32 has three equally spaced radial holes 43 which engage with pins 44 that pass through helical slots 45 in the shaft 18 at the roots of the helical splines 30. The radially inward ends of the pins 44 engage in axially splined transfer ring 60 which meets with a clutch actuator 46. The clutch actuator 46 has helical splines 47 which meet with helical splines 49 in a reaction member 48 which is screwed into the end of the shaft 18 and carries a flange which clamps the ball bearing inner race. These helical splines 47 and 49 are shaped to provide a rotational stop in one direction. A centralizing spring 50 bearing against the washers 51 held in place between shoulders and snap rings 52 in and on the reaction member 48 and actuator 46 pre-load the actuator 46 to a fixed axial position. The actuator contains a ball bearing 53 whose inner race is fastened to a control rod 54 which extends through a guide and sealing bushing 55 to outside gear box. The right housing hub 4 carries a seal 56 which contacts the guide in sealing bushing.

Figure 3:
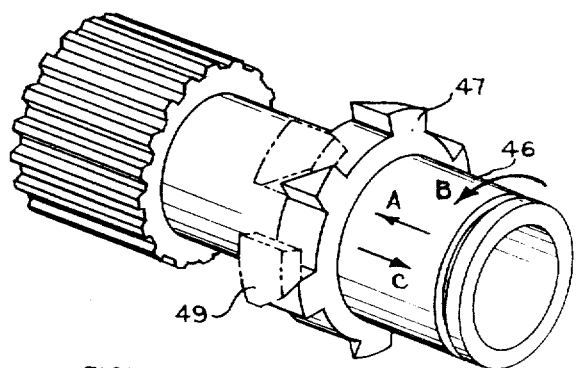
FIG. 3 is a perspective view of the helical arrangement between the clutch actuator and its corresponding reaction member in accordance with this invention.

Referring to FIG. 3, the clutch actuator 46 is shown in perspective view. Two teeth of helical spline 49 are shown as if detached from reaction member 48. Movement of actuator 46 in direction A causes rotation in direction B due to reaction of mating helicoidal surfaces; reaction member 48 always remains axially stationary. Angular motion between actuator 46 and reaction member 48 is limited by abutment of the radial surfaces of helical splines 47 and 49. To free the abutment of helicoidal surfaces 47 and 49, actuator 46 is moved in direction C. This then allows for unobstructed rotation of reaction member 48 thereby permitting a high torque exchanging configuration between the input means and the output means to develop.

OPERATION

The clutch is driven by a pinion (not shown) which engages the clutch mounted gear 7. In the disengaged position clearance is maintained between the friction disk 13 and pressure plates 16 and 17 by the wavy spring 39 and by the springs 14 at the friction disk splines 11 and 12. The clutch housing will rotate on the cylindrical roller bearings 1 and 2.

To engage the clutch for acceleration of the output load, the control rod 54 is moved leftward against the axial pre-load of the centralizing spring 50, which causes the actuator 46 to rotate relative to the shaft by action of the helical splines 47 and 49 between the reaction member 48 and the actuator 46. This relative rotation is transferred to the right pressure plate carrier 32 by the transfer ring 60 and pins 44. The pressure plate 17 moves leftward because of relative rotation of the shaft 18 and carrier helical splines 30, causing contact of the pressure plate 17 against the friction disk 13. The resultant drag due to rotation of the housing advances the right carrier 32 on its helical splines to move the friction disk 13 into contact with the lift pressure plate 16. Pressure plate 16 moves leftward against the Belleville spring 35 pre-load which spring 35 lifts pressure plate 16 off the lift carrier flange 31. The actuator 46 and the reaction member 48 helical splines 47 and 49 are designed to limit the relative rotation when the control rod 54 is moved leftward so that the right carrier 32 cannot move leftward far enough to make the left pressure plate 16 contact its carrier 31. The clutch pressure, and hence its slipping torque, will by governed by the Belleville spring force.

A much higher clutch torque capacity is required to drive the load at high speed than is permissible at the lower load acceleration speed. This is obtained by moving the control rod 54 rightward past its neutral position after synchronization. This rightward movement disengages the rotation limiting stop between the actuator 46 and the reaction member 48 helical splines 47 and 49 thereby permitting the right pressure plate carrier 32 to move further leftward due to load torque on the shaft helical splines until the left pressure plate 16 is in contact with its carrier 31. The carrier flange 31 is designed so its stiffness will be sufficient to provide a force capable of developing considerably more than full rated engine torque. The travels are so selected that the clutch will be able to transfer maximum engine torque even after maximum wear.

If the clutch were not initially engaged for low torque, movement of the control rod to the high torque position will not cause clutch engagement.

Once engaged, the clutch cannot be disengaged while it is carrying an appreciable torque load in the normal direction. However, the axial spring force on the pressure plate tends to cause disengagement and produce a negative torque to axial loading of the shaft helical splines 30. The amount of negative torque is determined primarily by the splines' helical angle, pitch diameter and co-efficient of friction, and by the diameter and co-efficient of friction of the thrust washer at the Belleville spring 35 inner-diameter. The teeth 33 between the left hand carrier 31 and the pressure plate teeth 34 are provided with angular clearance so that relative clutch plate rotation in the direction opposite normal torque will be accommodated at the Belleville thrust washer. These factors governing disengaging torque are selected so that the clutch will disengage and overrun when the load torque is reduced below some relatively low positive value.

While a preferred embodiment of the invention has been disclosed, it will be apparent to those skilled in the art that changes may be made to the invention as set forth in the appended claims, and, in some cases, certain features of the invention may be used to advantage without corresponding use of other features. Accordingly, it is intended that the illustrative and descriptive materials herein be used to illustrate the principles of the invention and not to limit the scope thereof.

Having described the invention, what is claimed is:

1. A torque exchanging coupling comprising:
   driving means;
   driven means;
   friction disk means having a plurality of friction members compressible to establish a torque exchanging connection between said driving means and said driven means;
   actuating means operative to initially engage said friction disk means when moved in a first direction, said actuating means being operatively disengaged from said friction disk means when moved in a second direction; and
   transfer means for transferring relative motion of said actuating means to said friction disk means, said transfer means and said actuating means providing a preset torsional limit when said actuating means is moved in said first direction, and said transfer means being operatively free from said actuating means when said actuating means is moved in said second direction, thereby allowing full torque capacity between said driving means and driven means to develop.

2. The coupling as claimed in claim 1 wherein said actuating means includes a selective control member for moving said actuating means in said first direction and said second direction.

3. A torque exchanging coupling comprising:
  input means;
  output means;
  friction disk means having a plurality of friction members compressible to establish a torque exchanging connection between said input means and said output means;
  a first helical spline connecting said output means to said friction disk means;
  transfer means having a second helical spline advanceable on said first helical spline to contactively engage one of said friction members;
  a movable control member;
  an axially stationary third helical spline; and
  actuating means having a fourth helical spline advanceable on said third helical spline operative to impart motion to said transfer means in response to said control member so that said helical splines co-operate upon movement of said control member thereby urging said transfer means into contactive engagement with said friction disk means causing motion of said input means to be transferred to said output means.

4. The coupling as claimed in claim 3 including further:
  biasing means operative to maintain said friction disk means in a mutually spaced apart relationship.

5. The coupling as claimed in claim 3 including further:
  disengagement means coupled to said friction disk means operative to permit limited counter-rotation of said friction disk means without slippage between adjacent friction members.

6. The coupling as claimed in claim 3 wherein the actuating means comprises a cylindrical member operatively connected to said control member, said cylinder having said fourth helical spline formed thereon for contactive engagement with said third helical spline, said third and said fourth splines shaped to provide a rotational stop in one direction, so that axial motion of said cylinder in one direction causes rotation of said second helical spline on said first helical spline until said third and fourth helical splines are fully engaged, and which cylinder upon motion in the opposite direction disengages from said third helical spline thereby allowing said second helical spline to advance even further on said first helical spline.

* * * * *